United States Patent
Bayart et al.

(10) Patent No.: US 7,233,431 B2
(45) Date of Patent: Jun. 19, 2007

(54) SEMICONDUCTOR OPTICAL AMPLIFIER BASED RAMAN PUMP

(75) Inventors: Dominique Bayart, Clamart (FR); Dominique Annie Mongardien, Antony (FR)

(73) Assignee: Alcatel, Paris (FR)

( * ) Notice: Subject to any disclaimer, the term of this patent is extended or adjusted under 35 U.S.C. 154(b) by 443 days.

(21) Appl. No.: 10/786,079

(22) Filed: Feb. 26, 2004

(65) Prior Publication Data

US 2004/0207907 A1    Oct. 21, 2004

(30) Foreign Application Priority Data

Apr. 16, 2003    (EP) ................... 03290941

(51) Int. Cl.
*H01S 3/00* (2006.01)

(52) U.S. Cl. ...................... 359/334

(58) Field of Classification Search ............ 359/334
See application file for complete search history.

(56) References Cited

U.S. PATENT DOCUMENTS 6,480,326 B2 * 11/2002 Papernyi et al. ............ 359/334
2002/0015220 A1    2/2002 Papernyi et al.
2004/0247275 A1 * 12/2004 Vakhshoori et al. ........ 385/129

FOREIGN PATENT DOCUMENTS

| EP | 0 395 277 A1 | 10/1990 |
|---|---|---|
| EP | 1 026 797 A2 | 8/2000 |
| JP | 2005011989 A * | 1/2005 |
| WO | WO 02/17520 A1 | 2/2002 |
| WO | WO 02/056510 A2 | 7/2002 |
| WO | 2004/013980 A2 * | 2/2004 |

OTHER PUBLICATIONS

D. Vakhshoori, et al., Raman Amplification Using High-Power Incoherent Semiconductor Pump Sources, PD47-1 thru PD47-3, OFC-2003.

* cited by examiner

*Primary Examiner*—Mark Hellner
(74) *Attorney, Agent, or Firm*—Sughrue Mion, PLLC

(57) ABSTRACT

An optical signal amplifier comprises a Semiconductor Optical Amplifier SOA used as semiconductor Amplified Spontaneous Emission ASE source. This SOA produces optical pumping seed which has to be amplified to get a large pump power. With such large pump power, it will be possible to counteract the loss in a fiber link of optical signals transmitted through it by applying said amplified pumping seed as Raman amplification on the optical signals. The invention further relates to a method for amplifying an optical signal comprising the combination of a semiconductor ASE source together with a high-power pump source. Latter will be used to amplify optical pumping seed to be produced by the semi-conductor ASE source. Accordingly, the obtained amplified pumping seed will be used to act as a Raman amplification of optical signals.

10 Claims, 2 Drawing Sheets

SEMICONDUCTOR OPTICAL AMPLIFIER BASED RAMAN PUMP

TECHNICAL FIELD

The present invention relates to a method for amplifying an optical signal. Furthermore, it is related to an optical signal amplifier. The invention is based on a priority application EP 03 290 941.8 which is hereby incorporated by reference.

BACKGROUND OF THE INVENTION

The continuous growth of bandwidth requirements in optical-based communications systems has resulted in a large demand for systems able to operate over a large spectral window partly outside the amplification band provided by Erbium-doped fiber amplifiers. Erbium-doped fiber amplifiers effectively operate over a limited wavelength band. Depending on amplifier configuration and fiber composition, Erbium-doped fiber can be used for amplification of optical signal defined over the telecommunications C-band and L-band i.e. respectively from approximately 1528 nm to 1568 nm and further up to 1620 nm. But, at least several different erbium-doped fiber amplification configurations would be required to cover this entire range which implies a high cost. And more severe restrictions will come from the use of Erbium-doped fiber amplifiers due to a to inhomogeneous gain spectrum with relatively high noise figure. Other rare earth-doped fiber amplifiers have been used for amplification outside the erbium wavelength band. But they exhibit very low efficiency as well as other technical problems associated with each particular kind of dopant when compared to Erbium-doped amplifiers.

Accordingly, other amplifier configurations have been develop to amplify wavelength band ranges greater than can be amplified with singular rare earth-doped amplifiers. An example which have attracted much attention comprises a Raman fiber amplifier as they can be used to extend the reach of long haul Dense Wavelength Division Multiplexed (DWDM) communication systems. Such amplifier converts laser radiation from a pump laser into another wavelength range through stimulated Raman scattering. More specifically, Raman scattering operates on the principle of Stokes light generation, which is downshifted from the optical pump frequency by an energy determined by vibrational oscillation modes in the atomic structure of the fiber. In other words, Raman gain results from the interaction of intense light with optical phonons in the glass, and the Raman effects leads to a transfer of power from one optical beam, or the pump, to another optical beam, or the signal. During a Raman scattering effect, the signal is downshifted in frequency i.e. upshifted in wavelength by an amount determined by the vibrational modes of the glass or the medium.

In operation, a pump laser is used to conduct pump radiation through a Raman medium. Signal radiation which propagates co-linearly with the pump will be amplified by stimulated Raman scattering, whereby a pump photon is stimulated to emit an optical phonon and also a photon at the same energy and phase as the signal photon. A counter propagation of signal radiation versus pump radiation is also conceivable. The wavelength range over which amplification occurs is referenced to the wavelength of the optical pump and the bandwidth is determined by the phonon spectra of the Raman medium. A direct consequence of this is that amplification can be realized at any wavelength in an optical fiber by correct choice of the wavelength of the optical pump.

One of the problems generally associated with Raman amplifiers is the requirement of a relatively large pumping power. A significant advantage, however, of Raman amplifiers is the low noise figure associated therewith close to the quantum limit of 3 dB.

In WO02/056510 is described an optical signal amplifier that includes a Raman fiber amplifier with a semiconductor optical amplifier. It makes use of the low noise figure typically associated with Raman amplifiers, the significant gain at the optical signal wavelength typically associated with semiconductor optical amplifiers and the residual pump power from a Raman amplifier to increase the saturation output power of semiconductor optical amplifier.

In "Raman amplification using high-power incoherent semiconductor pump sources" from D. Vakhshoori et al., PD47-1, OFC-2003, is described a distributed Raman amplifier using high-power and spectrally incoherent semiconductor pump sources. More than 250 mW of broadband Amplified Spontaneous Emission (ASE) has been efficiently generated from a single spatial mode semiconductor source. This was achieved through coupling of a low-power seed optical signal from a semiconductor ASE source into a long-cavity semiconductor amplifier waveguide which was optimized in design for center wavelength power amplification. Two seed sources and four power optical amplifiers devices were multiplexed in power and wavelength within the some butterfly package. This paper shows clearly that the achievement to amplify wavelength over a big band range at least covering the telecommunications C-band implies the use of several semiconductors pumps emitting at different wavelengths and multiplexed in polarization. This is irremediably connected to high cost due to the requirement to pay for several pumps for covering at least the C-band gain spectrum. Furthermore, discrete wavelengths means resulting gain excursion in the Raman gain spectrum.

SUMMARY OF THE INVENTION

In view of the above, it is an object of the present invention to provide gain for optical signals over a spectrum as broad as possible while using a method or a device being as cheap as possible. Furthermore, it is also an object to benefit of the broader and flatter gain spectrums with lower effective noise figure achieved using Raman amplification.

This object is achieved in accordance with the invention by the use of an optical signal amplifier comprising a Semiconductor Optical Amplifier (SOA) as semiconductor Amplified Spontaneous Emission (ASE) source. This SOA is then used for the production of optical pumping seed which has to be amplified to get a large pump power. With such large pump power, it will be possible to counteract the loss in a fiber link of optical signals transmitted through it by applying said amplified pumping seed as Raman amplification on the optical signals.

An embodiment of the optical signal amplifier according to the invention is characterized in that said SOA shows highest reflection coefficient on its back facet and lowest reflection coefficient on its opposite facet to be optically connected to a link fiber where optical signals will be propagating. In such a way, the SOA is optimized to act as a semiconductor ASE source producing optical pumping seed.

The invention further relates to a method for amplifying an optical signal comprising the combination of a semiconductor ASE source together with a high-power pump source. Latter will be used to amplify optical pumping seed to be produced by the semiconductor ASE source. Accordingly, the obtained amplified pumping seed will be used to act as a Raman amplification of optical signals.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
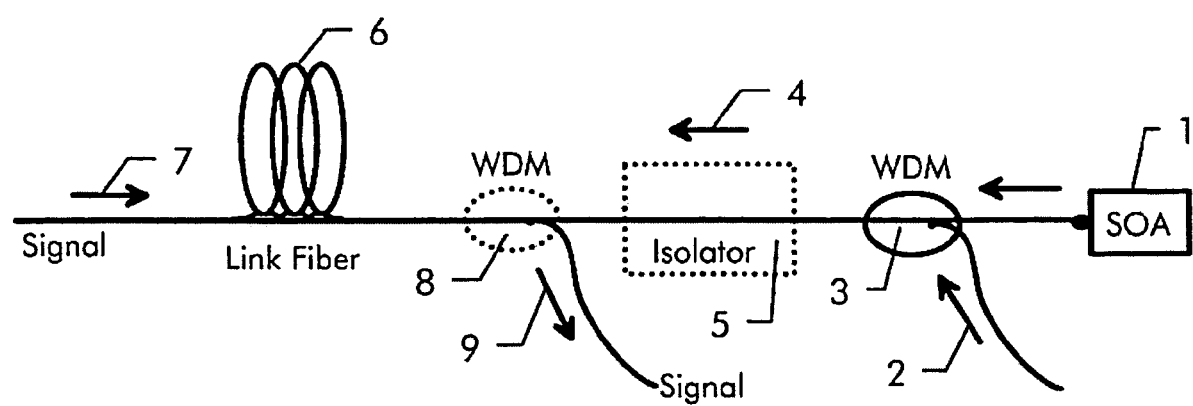
FIG. 1 is a schematic view of a composite optical amplifier including a link fiber for transmission of optical signals according to the present invention.

On FIG. 1 is shown a composite optical amplifier according to the present invention. It comprises a SOA 1 used as a semiconductor ASE source for the production of optical pumping seed. Latter will be optically coupled by a pump combiner 3 like a Wavelength Dense Multiplexer WDM with the emission of a high-power pump source. Both, the optical pumping seed and the emission of the high-power pump source 2 will be transmitted 4 to a link fiber 6 counter propagated by optical signals. These optical signals are received at the input 7 and transmitted at the output 9 of the link fiber 6. In the composite optical amplifier shown on FIG. 1, the optical signals are decoupled using a WDM 8 after propagating through the link fiber 6 such to be in interaction with pumping light only in the link fiber 6. For that, it may be preferably to implement a further isolator 5 between both used WDM 3 and 8 to avoid of rest of optical signals to enter into the high-power pump source 2 and/or the SOA 1.

Figure 2:
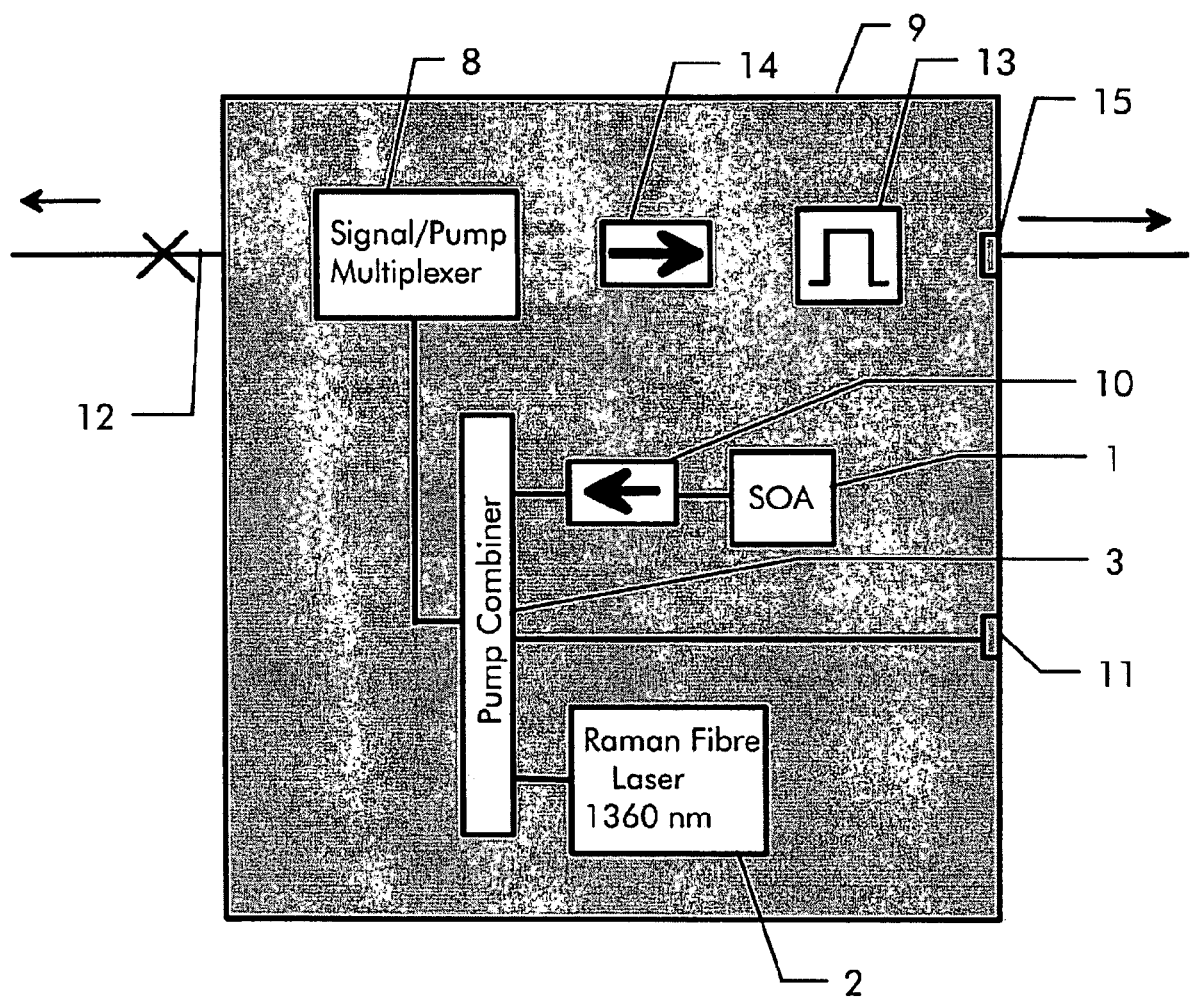
FIG. 2 is a schematic view of an embodiment of the optical signal amplifier according to the present invention.

On FIG. 2 is shown a more precise schematic view of an embodiment of the optical signal amplifier according to the present invention and possibly designed as a single package 9. It comprises the SOA 1 isolated from the pump combiner 3 directly by an isolator 10. To this pump combiner 3 is also optically connected the high-power pump 2 being preferably a Raman fibre laser e.g. centered at a wavelength possibly around 1340 nm or 1360 nm. A supplementary input 11 is provided to which a further pump centered could be coupled to cover even a larger band range. The pumping light coming from the pump combiner 3 will be directed using the WDM 8 towards an optical link 12 to be e.g. spliced with the output of the link fiber 6 (not shown on FIG. 2). The optical signal after propagating through the link fiber 6 where it will interact with the pumping light, will be directed towards an optical branch using the WDM 8 inside said package 9. Said WDM 8 can be preferably a wide band multiplexer. This allows to apply e.g. a band pass filter 13 preceded by an isolator 14 on the optical signal as a kind of reshaping procedure. The output 15 of that package 9 of the optical signal amplifier will be destined to collect the treated optical signal.

The optical isolator 14 is implemented to prevent from oscillations which could result from the combination of the Raman gain in the line with reflection s coming from the terminal equipment. Moreover, the band pass filter is implemented in order to reject the Raman noise present with the optical signal. But the use and the place of isolators 4, 10, 14 as well as the combiners 3, 8 and/or the filter 13 in FIGS. 1 and 2 are not exclusive. Different arrangements could be chosen still being covered by the present invention.

A method for amplifying an optical signal according to the present invention will be based on the use of a package similar to the one 9 shown on FIG. 2. The method comprises the steps of providing a semiconductor amplified spontaneous emission source here the SOA 1 for the production of optical pumping seed. Its gain peak can be taken new 1450 nm in order to provide optical pumping seed via Raman gain in the telecommunications transmission window around 1,55 µm comprising among others the (extended) C-band (~1528 nm till 1568 nm). Since this output power usually will not be high enough, the optical pumping seed will have to be further amplified in order to provide a significant Raman gain of the optical signal. This will be obtained by providing the high-power pump 2 used as a second-order Raman pump while the SOA 1 being the so-called primary pump with respect to the optical signal. Such high-power pump 2 can be preferably a Raman fiber laser centered at wavelength e.g. around 1340 nm as in the package 9 on FIG. 2. But other high-power pump could be chosen.

The SOA 1 and the high-power pump 9 are respectively first and second order Raman pump comparatively to the optical signal. Indeed, the optical signal is of frequency near the Raman gain peak caused by the first order pump which is itself of frequency near the Raman gain peak produced by the second order pump. Therefore, light to be emitted by the high-power pump source 9 when propagating through a link fiber 6 together with the optical pumping seed produced by the said SOA 1 acting as ASE source will ensure a Raman amplification of said optical pumping seed. Latter in turn will act as a Raman amplification of the optical signal transmitted through the link fiber 6 counteracting very effectively the usual occurring loss during propagation through a link fiber. And the Raman amplification of the optical signals will be distributed further along the link fiber 6 enabling a notably improvement of the noise figure.

It is possible to generalize the present method not only to optical signals defined in the telecommunications C-band but also clearly beyond like over the S-band (around 1460 nm till 1530 nm) and/or L-band. For that, it may be preferable to add a supplementary first order Raman pump possibly also a SOA acting as a ASE source so to be able to cover a spectral range optical signals comprising e.g. the telecommunications L-band. The optical pumping seed coming from that first order Raman pump will be combined in the some way as the previous first order Raman pump (see 11 on FIG. 2) with the light of the second order pump to be amplified in the link fiber before acting on the optical signals.

The first order Roman pump are chosen to be semiconductor amplified spontaneous emission source i.e. SOA used in the present invention for its emission of ASE and not as usual as a laser. An optimization of such semiconductor ASE source can be performed when its back facet will show highest reflection coefficient while its opposite facet from where the optical pumping seed will be launched towards the link fiber will show lowest reflection coefficient.

Furthermore, such first order Raman pump can be advantageously designed in order to provide similar gain when acting as Roman amplification in said link fiber on different polarized states of the optical signal. With such unpolarized emission, the polarization sensitive effects occurring during the transmission of the optical signals through the link fiber can be effectively restrained.

As shown on both FIGS. 1 and 2, the emissions from the first and second order Raman pumps are combined and launched usually but not exclusively counter-directionally to the optical signal from the receive side. And the light coming from the second order pump will amplify the optical pumping seed from the first order pump during their propagation throughout the link fiber 6 i.e. the optical pumping seed will grow along the fiber. Finally, the amplified pumping seed will produce at its turn Raman amplification of the optical signal transmitted through the fiber link. This pumping scheme has the advantage of giving the gain to the signal in a more distributed manner compared to prior art e.g. when launching a single high-power pump. Thus an optical signal amplifier as well as a method for amplifying an optical signal according to the present invention will notably give a better system noise performance.

The invention claimed is:

1. A method for amplifying an optical signal, comprising the steps of:
   providing a link fiber through which said optical signal will be transmitted;
   providing a low-power semiconductor amplified spontaneous emission source for the production of optical pumping seed at a first wavelength;
   providing a high-power pump source emitting light at a second wavelength which propagates through said link fiber together with said optical pumping seed to ensure a Raman amplification of said optical pumping seed,
   said amplified optical pumping seed providing Raman amplification of said optical signal transmitted through said link fiber at a third wavelength, wherein energy is transferred from the second wavelength to the first wavelength to the third wavelength.

2. The method for amplifying an optical signal according to claim 1, wherein the semiconductor amplified spontaneous emission source is optimized for Raman amplification of optical signal defined over a wide spectrum comprising the telecommunications transmission window around 1.55 μm.

3. The method for amplifying an optical signal according to claim 1, further comprising providing at least a supplementary semiconductor amplified spontaneous emission source for the production of optical pumping seed to be transmitted into said link fiber for Raman amplification of optical signal defined beyond the telecommunications C-band.

4. An optical signal amplifier comprising:
   a low-power semiconductor amplified spontaneous emission source to be optically connected to a link fiber for the production of optical pumping seed at a first wavelength;
   a high-power pump source to be optically connected to said link fiber and having the property to emit light to be transmitted to said link fiber at a second wavelength ensuring a Raman amplification of said optical pumping seed when propagating through said link fiber together with said optical pumping seed,
   said amplified optical pumping seed being chosen to provide Raman amplification of an optical signal propagating through said link fiber at a third wavelength, wherein energy is transferred from the second wavelength to the first wavelength to the third wavelength.

5. The optical signal amplifier according to claim 4, wherein said semiconductor amplified spontaneous emission source is a semiconductor optical amplifier.

6. The optical signal amplifier according to claim 5, wherein said semiconductor optical amplifier shows highest reflection coefficient on its back facet and lowest reflection coefficient on its opposite facet to be optically connected to said link fiber.

7. The optical signal amplifier according to claim 5, wherein said semiconductor optical amplifier is optically connected to a single optical waveguide to be further connected to said link fiber.

8. The optical signal amplifier according to claim 4, wherein said semiconductor amplified spontaneous emission source provides a similar gain when providing Raman amplification in said link fiber on different polarized states of the optical signal.

9. The optical signal amplifier according to claim 4, further comprising at least a supplementary semiconductor amplified spontaneous emission source to be optically connected to said link fiber and acting as source of optical pumping seed for amplification of optical signal defined beyond the telecommunications C-band.

10. The optical signal amplifier according to claim 4, wherein said high-power pump source is a Raman fiber laser adapted for a treatment of optical signal defined at least over the telecommunications transmission window around 1.55 μm.

* * * * *